Patented July 29, 1924.

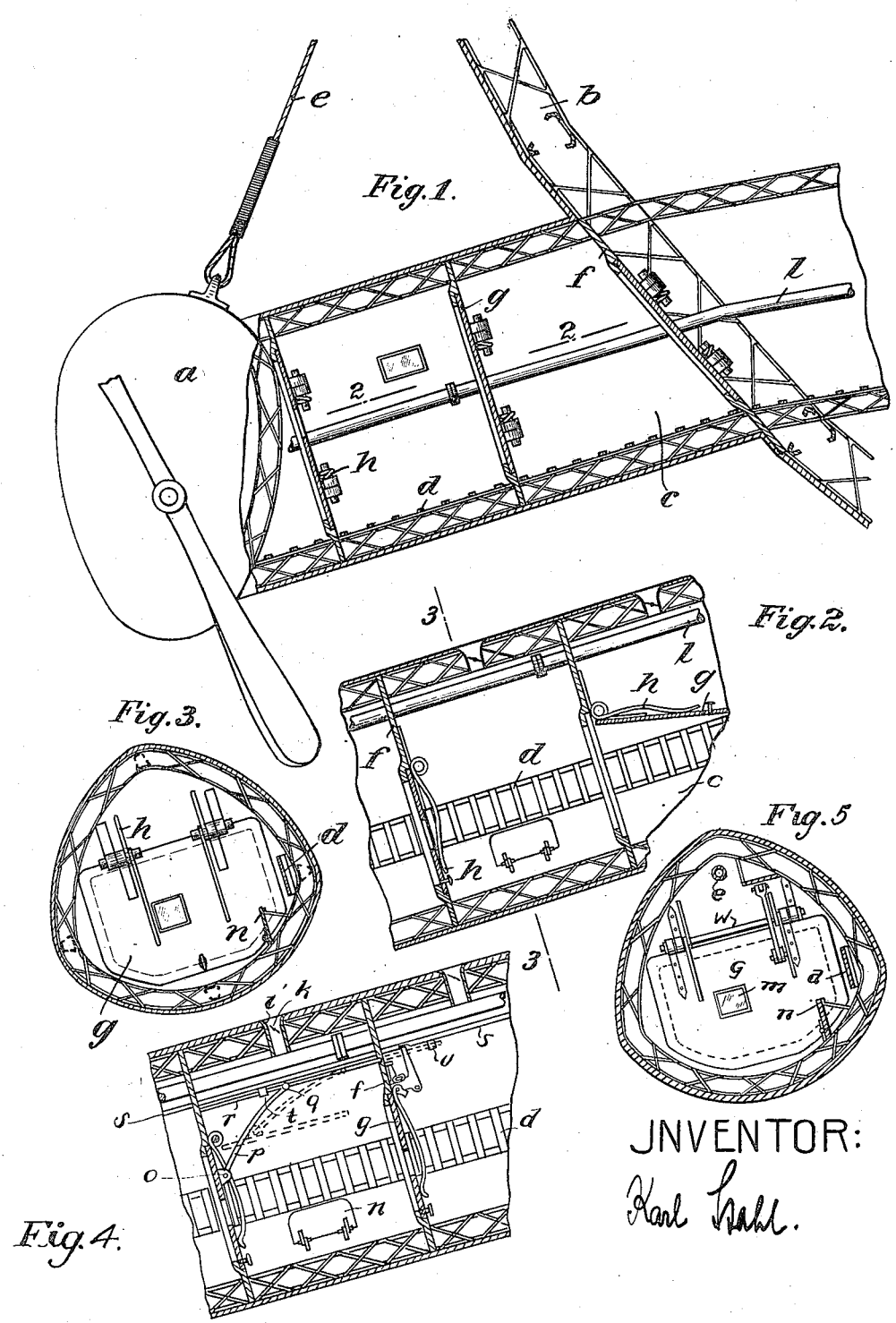

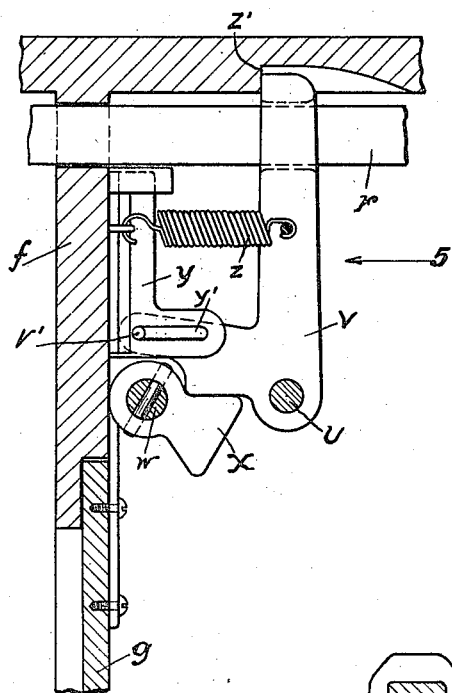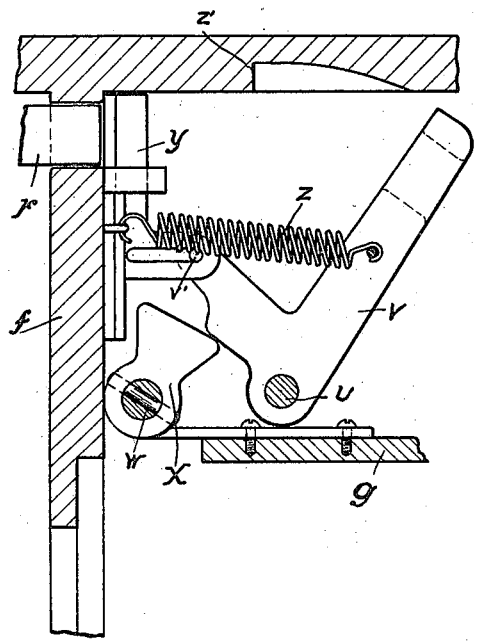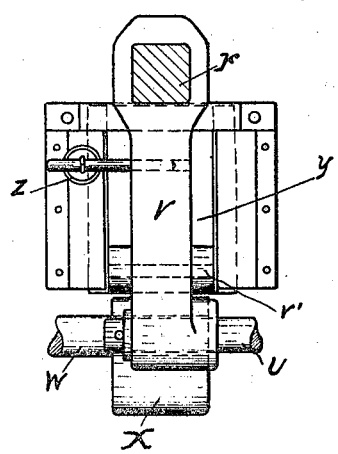

1,503,140

UNITED STATES PATENT OFFICE.

KARL STAHL, OF FRIEDRICHSHAFEN, GERMANY, ASSIGNOR TO THE FIRM: LUFT-SCHIFFBAU ZEPPELIN GESELLSCHAFT MIT BESCHRANKTER HAFTUNG, OF FRIED-RICHSHAFEN, GERMANY.

AIRSHIP GONDOLA.

Application filed October 26, 1921. Serial No. 510,582.

*To all whom it may concern:*

Be it known that I, KARL STAHL, a German citizen, residing at Friedrichshafen-on-the-Bodensee, Germany, have invented certain new and useful Improvements in Airship Gondolas, of which the following is a specification.

My invention refers to airships and more especially to the motor gondolas connected with airships.

Modern airship motors owing to their great reliability do not absolutely require permanent attending and observing. As a rule, the working of the motors need only be supervised from a central stand by aid of remote control revolution counters, thermometers, etc., as has already been done in the case of flying machines provided with a plurality of motors. However, in airships there should be a possibility of making repairs and it is further desirable that the attendant be stationed near the motor in order to be able to interfere at once in the case of irregular working of the motor.

This possibility is afforded according to the present invention by the motor gondola being connected with the body of the airship by a preferably airtight shaft.

In the drawings affixed to the specification and forming part thereof, part of an airship with a motor gondola connected therewith according to the present invention, is illustrated diagrammatically by way of example. In the drawings—

Fig. 1 is a sectional view of part of the airship hull with the motor gondola and the gangway or shaft connecting them, while Fig. 2 is a longitudinal section of the gangway on the line 2—2 in Fig. 1, and Fig. 3 is a cross-section on the line 3—3 in Fig. 2.

Fig. 4 is a view similar to the one shown in Fig. 2 and disclosing means for preventing more than one door to be opened at a time.

Fig. 5 is a cross-section on the line 4—4 in Fig. 4.

Figs. 6 and 7 are side elevations showing means locking the doors, drawn to a larger scale, and Fig. 8 is an end elevation corresponding to Fig. 6 and viewed in the direction of the arrow 5.

Referring to the drawings $a$ is the gondola, $b$ the contiguous part of the airship body and $e$ is a suspension cable. $c$ is the shaft connecting the gondola with the airship body. Preferably this shaft is streamlined in order to minimize air resistance. In order to safeguard against fire the shaft or gangway is subdivided by gas-tight bulkheads $f$, provided with doors $g$, into several compartments. In order to prevent gas from entering the doors are kept in closing position by springs $h$ in such a manner as to allow of being opened only when the next succeeding door is closed. $d$ is the floor and $l$ are pipes for the supply of petrol, lubricating oil and the like to the gondola. The gangway may serve as a stand for the motor attendant, thus saving the space hitherto reserved for him in the gondola, whereby the gondola may be made smaller and lighter, thus improving the aerodynamic conditions. It may further serve as a connecting shaft and in this case the stand of the man attending to contiguous motor gondolas may be disposed in the airship body intermediate the shafts leading to these gondolas.

It may further be used for supplying the gondola with fresh air as well as with hot air for heating purposes. The shaft may be so designed, as to partly support the gondola. Instead of making the shaft itself streamlined, it may have any desired section and may be covered with a streamlined shell.

By generating an increased pressure intermediate the single bulkheads, further security against the inflow of gas can be obtained. In order to prevent more than one door from being opened at a time, the means disclosed in Figs. 4–8 may be employed. As shown in the drawings, rod $p$ is linked to one door at $o$, the forked head $q$ of this rod being in its turn linked to a lock bar $r$ guided in bearings $t$ along the lateral wall $s$ and extending through the wall $f$ so as to be able to lock the door $g$. The locking means cooperating with rod $r$ are a lever $v$ pivoted to a stationary bolt $u$, a cam $x$ fixed on the door hinge and serving to control lever $v$ and a locking bolt $y$. The length of rod $r$ is such that, as long as the left hand door is closed, the end of the rod does not project beyond the wall $f$, as shown in full lines. In this position, either one or the other door can be opened, but never both of them simultaneously. On the left hand door being opened, as shown in dotted lines, rod $r$ is shifted across the wall $f$ and passes through an aperture in the free end of lever $v$, (Figs 4 and 6), whereby the right hand door is locked, cam $x$ fixed on its hinge pin being applied against the horizontal arm of the lever. If the left hand door is closed, the right hand door can be opened, the cam $x$ being at the same time moved into the position shown in Fig. 7, whereby the horizontal arm of lever $v$ being operatively connected by means of a pin $v'$ with a slotted extension $y'$ of locking bolt $y$, will be caused to displace this bolt in upward direction, whereby the bolt will place itself in front of the free end of rod $r$, which is thus prevented from being shifted horizontally and thereby locks the left hand door. Lever $v$ is acted upon by a spring $z$ which tends to pull it into normal positions, its free end resting against an abutment $z'$.

The shaft may further serve for storing therein all kinds of appliances required in the general service of an airship such as fuel and lubricant pipes and containers, instruments, ballast, scoops, radiators and the like.

I wish it to be understood that I do not desire to be limited to the exact details of construction shown and described for obvious modifications will occur to a person skilled in the art.

I claim:

1. In an airship in combination, an airship body, a gondola projecting and suspended from said body, a passageway or shaft connecting said gondola with said body and bulkheads subdividing said shaft into several compartments.

2. In an airship in combination, an airship body, a gondola projecting and suspended from said body, a passageway or shaft connecting said gondola with said body, bulkheads subdividing said shaft into several compartments and a door in each bulkhead adapted to be opened only when the adjoining door is closed.

In testimony whereof I affix my signature.

KARL STAHL.